United States Patent [19]

Mesnel

[11] 4,183,778
[45] Jan. 15, 1980

[54] METHOD OF MAKING SEALING STRIP JOINT

[75] Inventor: Francois Mesnel, Neuilly-sur-Seine, France

[73] Assignee: Etablissements Mesnel, Carrieres-sur-Seine, France

[21] Appl. No.: 851,255

[22] Filed: Nov. 14, 1977

[51] Int. Cl.$^2$ .................. B29C 19/00; B32B 31/00; B29C 19/00; B29H 7/04

[52] U.S. Cl. .................. 156/245; 156/258; 156/304; 264/152; 264/261

[58] Field of Search ............... 156/304, 250.8, 244.22, 156/244.18, 305; 264/152, 261, 263; 156/245

[56] References Cited

U.S. PATENT DOCUMENTS

| | | | |
|---|---|---|---|
| 33,193 | 9/1861 | Hale | 156/304 |
| 2,392,734 | 1/1946 | Haberstump | 156/304 |
| 2,571,259 | 10/1961 | Kusiak | 264/152 |
| 3,279,971 | 10/1966 | Gardener | 156/304 |

FOREIGN PATENT DOCUMENTS

2355806 11/1973 Fed. Rep. of Germany .

*Primary Examiner*—Douglas J. Drummond
*Attorney, Agent, or Firm*—Schwartz, Jeffery, Schwaab, Mack, Blumenthal & Koch

[57] ABSTRACT

Process and mold for joining two lengths of elongated composite sealing strips, for use on a vehicle body, in end-to-end relationship at a predetermined angle, each composite sealing strip being made up of a gripping portion to be mounted on the body and extrudedly made of compact plastics material, and of a sealing portion extrudedly made of cellular plastics material, the portions extending lengthwise of one another to form the sealing strips. The strip lengths are first cut crosswise at equal angles suitable to produce the aforesaid predetermined angle when the ends are in the aforesaid end-to-end relationship and the strip lengths are placed end-to-end with like portions in alignment. Welding plastics material is then injected over at least two of the aligned and like portions at the abutted ends and between the ends thereof whereby to weld the strip lengths together in one single operation. Thereafter, the injected plastics material is allowed to set.

11 Claims, 8 Drawing Figures

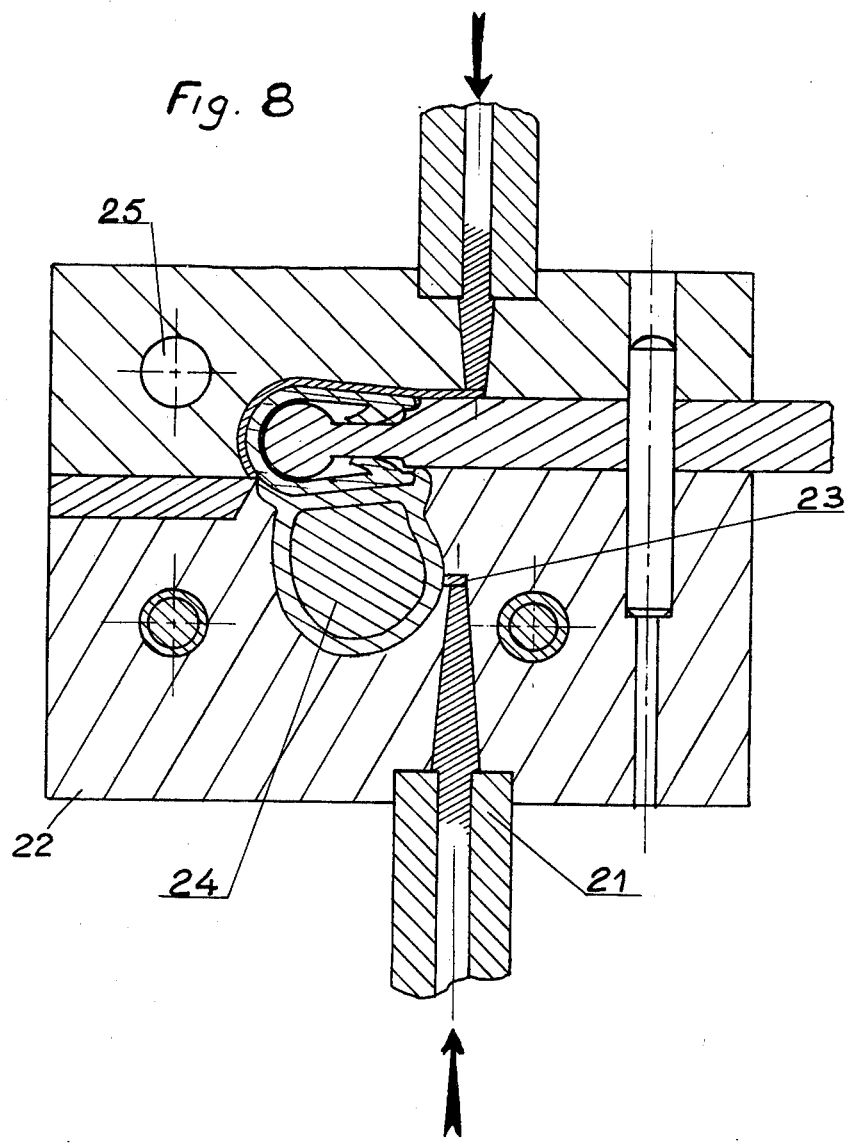

METHOD OF MAKING SEALING STRIP JOINT

The present invention relates to a process and a mold for joining two lengths of sealing strips.

Sealing strips, particularly for use on automobile doors and of the composite type, are known. They are made up of two parts. One part is a shape extruded in plastics material, with a central metallic reinforcement, and having the form of a gripper. The second part is another shape which is either tubular or in the form of a lip or which may combine these two features, this second part being likewise extruded but in cellular material. It is possible with this strip to obtain a sealing effect overall of the periphery of the doors because of the self-securing feature of that part which has the shape of a gripper which is fixed on the edge of the inner face of the door frame.

However, in order that such a sealing strip follow the contour of the body properly—there generally being a right angle located at its upper end—a joint between two lengths of such strip has to be prepared which, presently, is obtained by a fairly expensive process because it is made in two successive operations after each of the constituting parts or portions of the two lengths to be connected has been laboriously prearranged.

An object of the present invention is to simplify and reduce the cost of such joints. Another object is to strengthen them by cleverly combining, in a single operation: the injection, under heat, of a thermoplastic resin capable of welding and strengthening the reinforced shape which is formed like a gripper and, simultaneously in the same mold and in a known manner, the vulcanization of a solution which has previously been applied over the angularly cut faces of the sealing shape made of a cellular elastomer.

It is a further object of the invention to carry over and adapt the aforesaid arrangements to the making of sealing strips joints wherein the strips are of the bi-component type having the same function but which are then characterized in that the two shapes are simultaneously extruded in vulcanized elastomer which, in the case of the shape having the form of a gripper, is a compact material and, in the case of the sealing shape, is a cellular material. In this case, the sealing strip lengths may be joined according to the invention either by the injection of a vulcanizable rubber or of a polymer of the nonvulcanized injectable type.

Embodiments of the invention will now be described with reference to the appended drawings wherein:

FIG. 5 is a plan view of two lengths of the gripper portion straddling the insert of the mold of FIG. 4;

Figure 4:
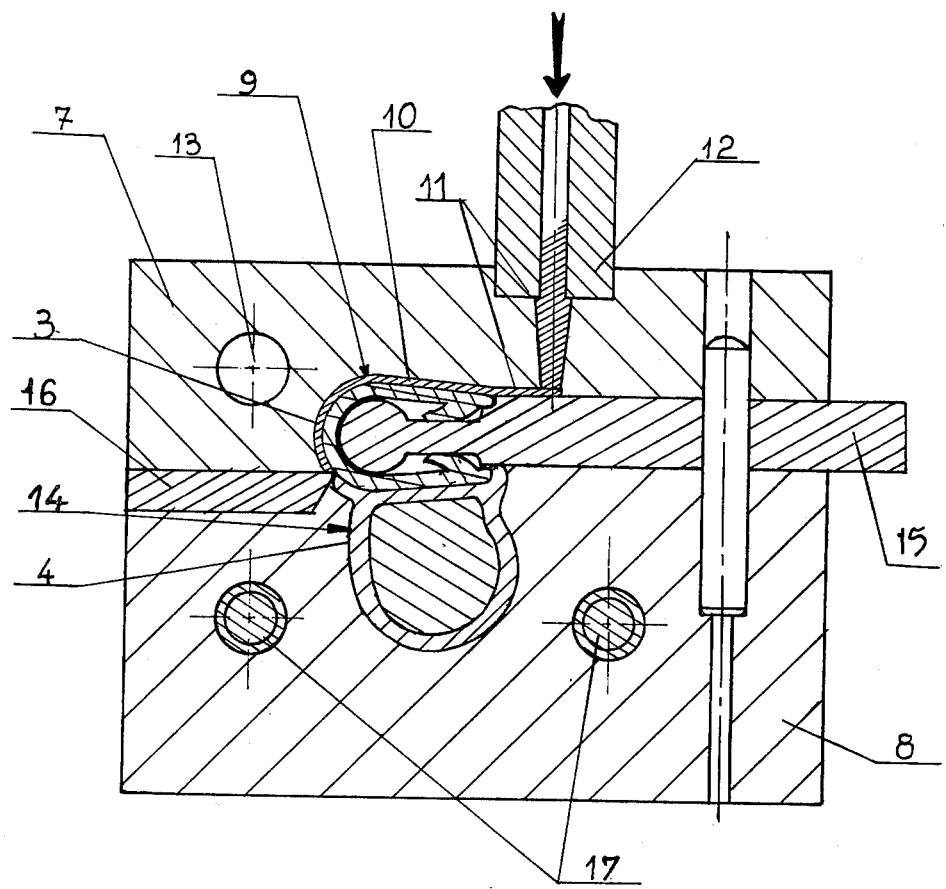
FIG. 4 is a cross-sectional view through a mold suitable to produce, in a single operation, the joining of the two sealing strip lengths of FIG. 2.
Figure 6:
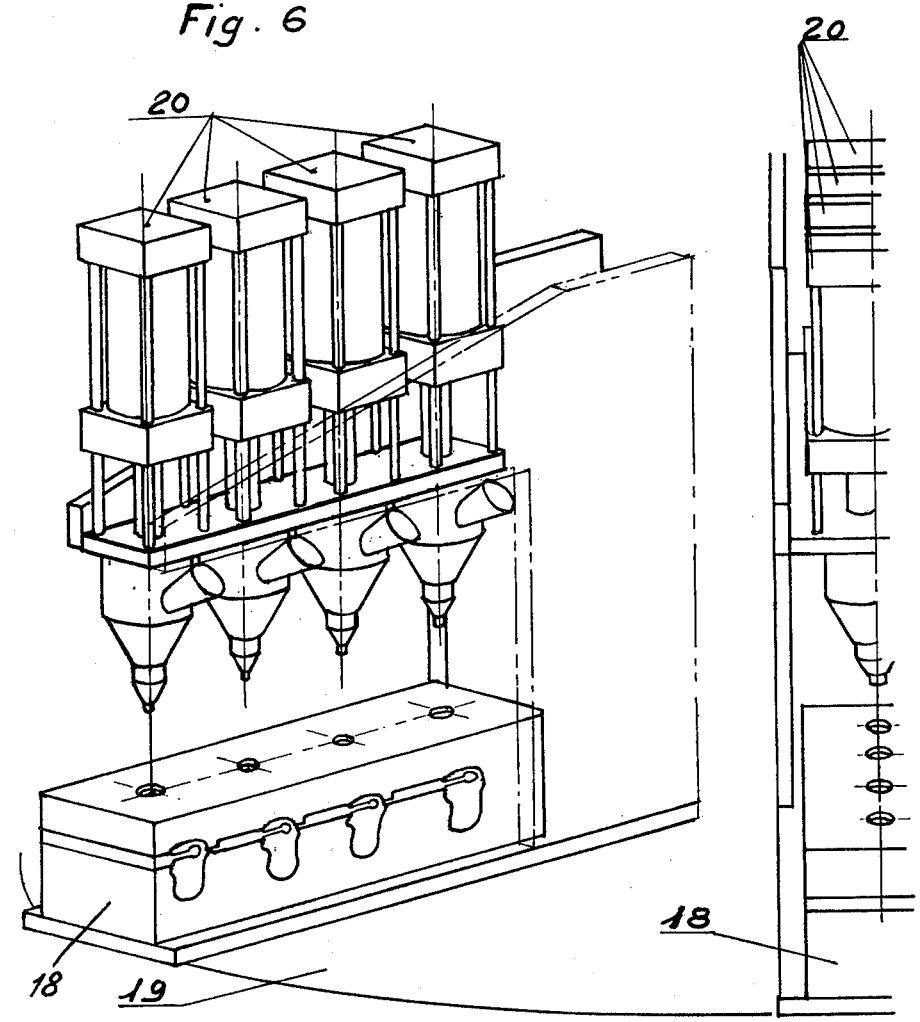
Figure 7:
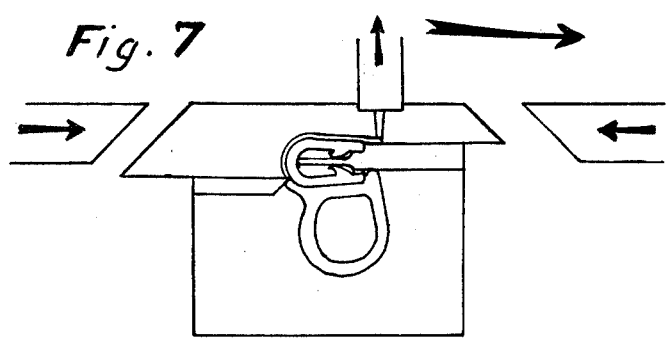

FIG. 6 is a perspective view of a machine of the mold-carrying rotary platen type which thus makes it possible to advance successively numerous molds of the type shown in FIG. 4 wherein each mold further has four cavities thereby increasing the production rate accordingly, the machine allowing also for adjusting the short duration of the injection with the much longer time necessary for vulcanization of the solution inserted between the angular faces of the cellular material sealing shape;

FIG. 7 is an elevation view schematically illustrating a device for rapidly clamping a single or multiple cavity mold on a machine platen as shown in FIG. 6, and FIG. 8 is a cross-sectional view of a mold for carrying out the invention, similar to that of FIG. 4 but improved to allow double simultaneous injection.

Figure 1:
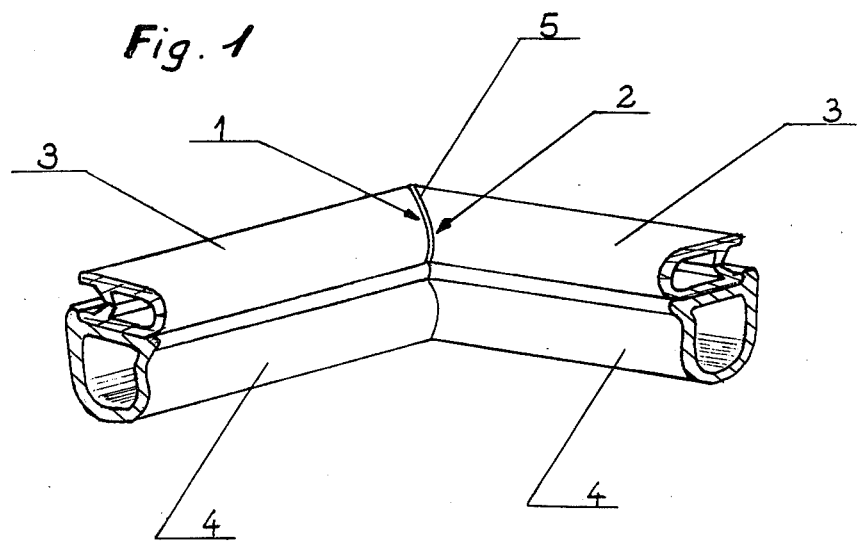
FIG. 1 is a perspective view of a joint, made according to the prior art, between two lengths of sealing strips for automobile body.

FIG. 1 shows a conventional miter-joint between two lengths of sealing strips for car body of the general type under consideration. As is known, this joint is made in two successive operations after the ends of the strips have been previously cut at an angle, as at 1 and 2, for forming a miter-joint. A cut is made, on the one hand, across each U-shaped gripping portion 3 which is extruded about a central metal armature and is generally made of plastics material of polyvinyl-chloride. A cut is also made across the tubular sealing portion 4 which is extruded in cellular elastomer and which is glued to the gripping portion 3.

The above preparation is completed by a rather difficult and arduous stripping of lengths of the inner metal armature of the gripping portion 3 which are uncovered when the aforesaid cuts are made and which would otherwise make it difficult to apply an additional thickness of plastics material—of the order of 2 millimeters—which is necessary to achieve the welding 5. This first welding is obtained in known manner by inserting appropriate hot plates between the angular faces 1 and 2 in order to raise their temperature to fusion temperature and then by rapidly bringing them together whereby to join them solidly and permanently.

Thereafter, in a second operation and after having coated the angular faces of the other sealing portion 4, generally made of a cellular elastomer, with a vulcanizable solution, the lengths of sealing strips thus prepared are placed in the usual manner in a mold, appropriately hollowed out and heated to a temperature in the order of 160° C., causing vulcanization of this angular assembly in a few minutes.

Figure 2:
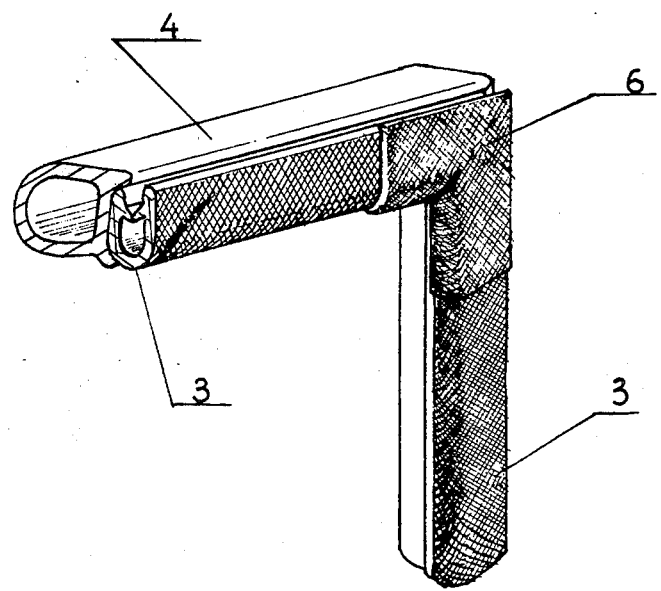
FIG. 2 is a perspective view of a similar joint but made according to the present invention.
Figure 3:
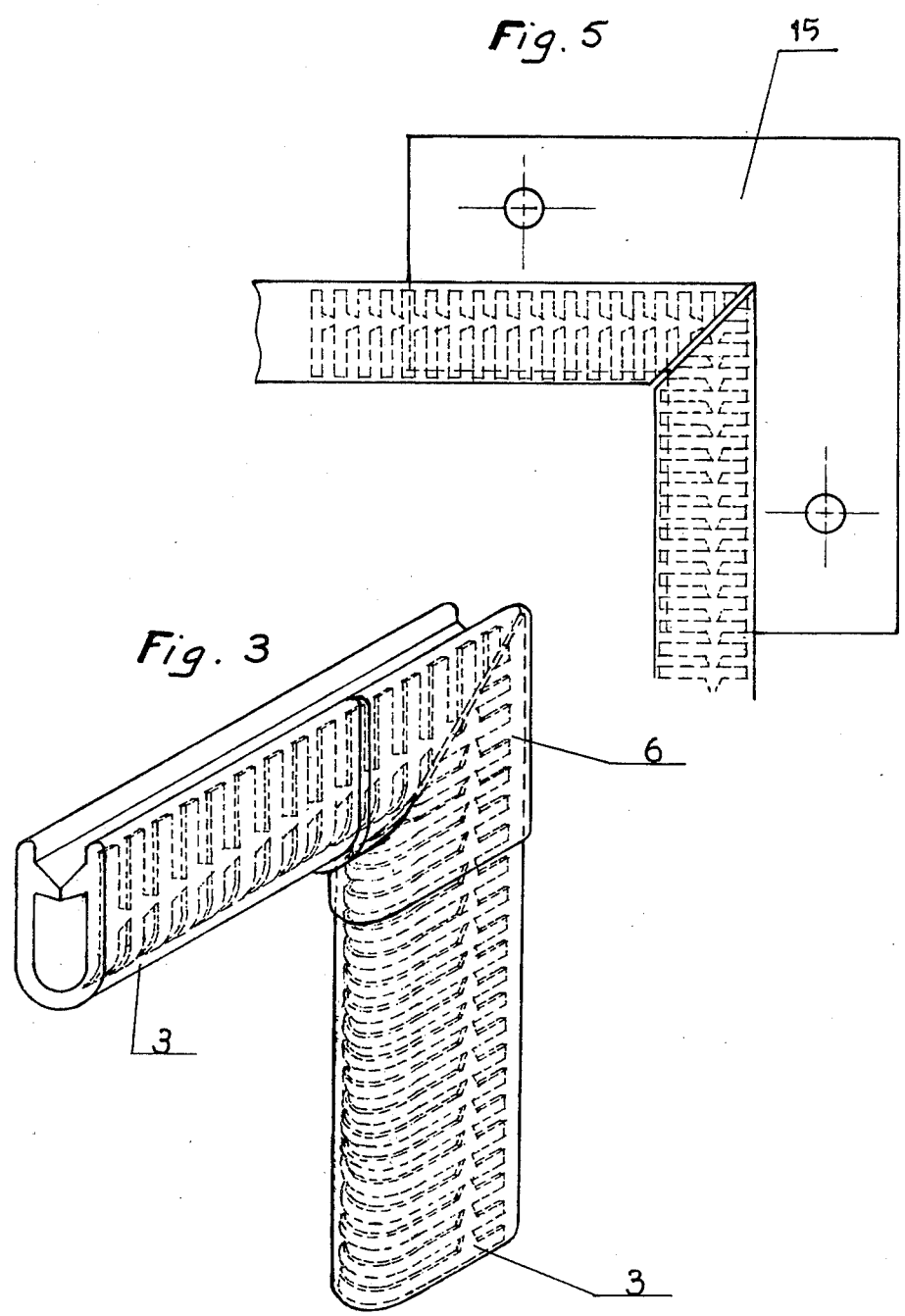
FIG. 3 is a perspective view of a joint involving solely the gripping portions of the sealing strip lengths, the part shown in broken line being the metallic armature.

To the contrary, according to FIG. 2 and in conformity with the present invention, the same type of sealing strip joint is achieved, on the one hand, far more economically in a single operation and, on the other hand, in a reinforced manner in that the inner metal armature need no longer be stripped from the cut lengths and in that, furthermore, a sort of gusset 6 made by an overthickness is obtained during the injection of thermoplastic resin, considerably reinforcing the welding made in the angle area.

To achieve this result, use is made of an ingenuous and perfected mold according to FIG. 4. This mold has an upper shell 7 adapted to allow the injection of a non-reactive polyurethane thermoplastic resin in the area of the angle of the gripping portions 3. On the other hand, the mold has a lower shell 8 which is adapted simultaneously to achieve the usual vulcanization of a solution in the same angle area but then of the other shapes, that is of the cellular sealing portions 4.

More specifically, this upper shell 7 of the mold comprises, besides the cavity 9 capable of receiving the upper part of the two lengths of the gripping portions 3, a little additional cavity 10 or countercavity defining, as shown, a rounded right angular turn. This countercavity 10 extends into a throttled and bent feed channel 11—11 adapted to be connected to the base of an injection nozzle 12 of a conventional machine. Besides, this upper shell 7 further includes a circuit 13 for cooling, with water for instance, to limit the temperature of the shell to about 40° C.

The lower shell 8 of the mold is formed with a cavity 14 complementary to the cavity 9 of the upper shell 7 so that the two cavities together contain the two lengths of composite sealing strips to be angularly joined, that is, the two lengths of gripping portions 3 and the two lengths of the complementary sealing portions 4. As shown on the right of FIG. 4 and in the plan view of FIG. 5, an insert 15 is interposed in the arrangement aforedescribed. On the other hand, the left of FIG. 4 shows the provision of a thermally insulating element 16, between the shells 7 and 8 of the mold, to limit the exchange of heat between these two shells of which the temperatures are quite different inasmuch as the lower shell 8 of the mold is heated to a temperature of the order of 160°, by electrical coils such as 17 for instance, whereas it should be recalled that the upper shell 7 is, to the contrary, cooled as has been said previously.

It will readily be understood that the interaction of the aforedescribed means and processes, there is obtained if not simultaneously at least conjointly, on the one hand and almost instantaneously, welding of the two gripping portions 3 by the injection in that area of a polyurethane thermoplastic resin, at a temperature of the order of 250° C. through the nozzle 12, while at the same time reinforcing this angular assembly by the simultaneous injection of the same resin in the previously mentioned countercavity 10 of the mold. On the other hand, vulcanization of the solution coated on the angular faces of the sealing portions 4 starts simultaneously but will have to be pursued in the usual manner, in the heated shell 8, for a few minutes.

It is, on the one hand, to compensate for this difference in the duration of the cycles of these two joined operations and, on the other hand, to increase productivity that use is made of a machine having a mold-carrying rotary platen of the type shown in FIG. 6, with which it is possible to move a certain number of molds, such as 18 driven by a rotary platen 19, under a multiple nozzle injection device such as 20, the number of nozzles being commensurate with the number of cavities in each multiple mold 18. On the other hand, the moving speed of the molds 18 is adjusted in such a manner that a complete turn of the platen 19 corresponds to the time necessary for vulcanization of the solution in the heated shell 8 as has been explained previously. FIG. 7 is intended to show schematically a device for rapidly clamping the successive molds which, for instance, may be actuated by jacks. This clamping device is intended to increase productivity.

Referring again to FIG. 4, it is worth mentioning that the aforedescribed process is, besides, apt to improve the formation of angular joints, namely in the case where use is made of two gripping portions 3 of different cross-sections since it will suffice to provide in the mold appropriate countercavities such as 10 of which the contour is defined so as to esthetically join these two different shapes. It may further be specified that the invention yet contemplates substituting the polyurethane injection to a polyester injection.

The embodiment illustrated in FIG. 8 is intended for the application, to the aforesaid bi-component sealing strips, of the arrangements described above with respect to composite sealing strips. Because the former strips result from two shapes that are simultaneously extruded out of a vulcanized elastomer, it is then advantageous to perfect the mold of FIG. 4 namely by providing it with a second injection nozzle 21 in its lower shell 22. This second nozzle 21 has a throttled bent feed channel 23 whereas the inside of the tubular sealing portion 4 is provided, in its angle area, with a removable or destructible insert 24 which, as may appropriately be said, can likewise be used in the mold of FIG. 4.

With this new combination, as improved, it is only necessary simultaneously to inject through the two nozzles an appropriate welding substance which, for instance, can be a polymer of the thermoplastic elastomer type to obtain the joint to which the invention is directed. On the other hand, if substitution is made in the upper shell of the mold of a heating means 25 to the previously mentioned cooling channel, it is possible then to obtain joining of the two sealing strips by a double injection of a vulcanizable rubber after the two lengths of the joint have been treated with an appropriate solution.

In all cases, the joint according to the invention is much stiffer than previously since the material injected has a final hardness which gives an appreciable reinforcement.

This stiffness is extremely useful in car bodies where the angle area often overlaps the fabric that covers the inner face of the roof of the car and which, spread out under slight tension, tends to lower the end of the angle and thus create an unsightly appearance as well as tending to pull away as is often the case with the prior art joint.

Thus there is provided, according to the invention, new industrial products characterized by a design which is well adapted to automobile bodies with a more esthetic presentation, a greater elasticity and an improved sealing quality while being easier and more economical to produce and further offering an appreciable increase in production.

Finally, it is obvious that the invention is not at all limited to the sole examples just described or inferred above but, to the contrary, its field spreads expressly not only to embodiments making use of a means or process of one of the aforedescribed combinations with those of another but also to all other variants of execution or applications and, especially, to those making use of equivalent or simply comparable means and processes, namely by inversion or transposition of the arrangements described and illustrated.

In this regard, it is here and thus specified that the field of the invention extends to cases where the gripping portion of the sealing strip comprises an esthetic covering, of fabric material made of synthetic or natural fibers for instance, since experience has shown that contrary to what may have been feared and with or without particular preparation, the ends of the portions to be joined, the cooling speed of the assembling injection is such that the aforesaid coverings are not affected.

I claim:

1. A process for joining two lengths of elongated sealing strips, for use for example on a vehicle body, in an end-to-end relationship at a predetermined angle, each composite sealing strip comprising: (a) an elongated gripping portion to be mounted on said body formed of a compact plastic material, and (b) an elongated sealing portion formed of cellular plastic material, said portions extending and connected together in the lengthwise direction to form said composite sealing strips, wherein said process comprises the steps of:

(1) cutting the ends of said strip lengths crosswise at equal angles for producing the predetermined desired angle when said ends face one another in an end-to-end relationship, (1a) coating the faces of said ends of said sealing portions with a vulcanizable elastomeric solution, (2) placing said lengths end-to-end and facing said ends with like material portions in alignment in a single mold with said compact plastic material portion in substantially one section of said mold and said cellular plastic material sealing portion in substantially another section of said mold, (3) injecting plastic material over at least two of said aligned and like portions at the ends thereof and between the ends thereof to weld said strip lengths together in one single operation, (4) allowing said injected plastic material to set, thereby forming a juncture between said strip lengths and a reinforcing gusset thereover.

2. A process as claimed in claim 1, wherein said welding plastics material is a thermoplastic polyurethane non-reactive resin and said injection welding and vulcanization take place in a single mold.

3. A process as claimed in claim 1, wherein said welding plastics material is a polyester resin and said injection welding and vulcanization take place in a single mold.

4. A process as claimed in claim 1, wherein said welding plastics material is a polymer of non-vulcanizable injectable type and said injection of said welding plastics material takes place in a single mold.

5. A process as defined in claim 1 including additionally heating one section of the mold.

6. A process as defined in claim 1 including cooling one section of the mold.

7. A process as claimed in claim 1 including limiting the exchange of heat between said mold sections.

8. A process as claimed in claim 7 wherein said heat exchange limiting is accomplished by interposing an insert between said mold sections.

9. A process as claimed in claim 1 including injecting plastic material substantially simultaneously into both of said mold sections.

10. A process as claimed in claim 1 including maintaining the temperatures of the two mold sections at different temperatures during joining.

11. A process as claimed in claim 1 including a metal reinforcement in one of said portions.

* * * * *